US007417530B1

(12) United States Patent
Craig

(10) Patent No.: US 7,417,530 B1
(45) Date of Patent: Aug. 26, 2008

(54) SLEEP SAFETY ALARM

(76) Inventor: E. Charles Craig, 5367 Dixieland Rd. P.O. Box 100611, Irondale, AL (US) 35210

( * ) Notice: Subject to any disclaimer, the term of this patent is extended or adjusted under 35 U.S.C. 154(b) by 86 days.

(21) Appl. No.: 11/522,824

(22) Filed: Sep. 13, 2006

Related U.S. Application Data

(63) Continuation-in-part of application No. 10/783,302, filed on Feb. 23, 2004, now abandoned.

(51) Int. Cl.
*H04B 3/36* (2006.01)

(52) U.S. Cl. .................... 340/407.1; 340/540; 340/541; 340/545.1; 340/577; 340/628; 340/692

(58) Field of Classification Search .............. 340/407.1, 340/540–541, 545.1, 628, 692
See application file for complete search history.

(56) References Cited

U.S. PATENT DOCUMENTS

| | | | | |
|---|---|---|---|---|
| 4,195,287 | A | 3/1980 | McCoy et al. | 340/521 |
| 4,264,904 | A | 4/1981 | McCoy et al. | 340/521 |
| 4,411,034 | A | 10/1983 | Williams | 5/494 |
| 4,612,535 | A * | 9/1986 | Sequin et al. | 340/539.26 |
| 4,614,939 | A | 9/1986 | Wang | 340/573.1 |
| 4,697,581 | A * | 10/1987 | Endo et al. | 601/78 |
| 5,076,260 | A * | 12/1991 | Komatsu | 601/59 |
| 5,181,504 | A * | 1/1993 | Ono et al. | 601/70 |
| 5,867,105 | A | 2/1999 | Hajel | 340/691.3 |
| 5,912,624 | A | 6/1999 | Howard, II | 340/632 |
| 5,917,420 | A * | 6/1999 | Gonzalez | 340/691.7 |
| 6,285,289 | B1 | 9/2001 | Thornblad | 340/628 |
| 6,377,177 | B1 | 4/2002 | Broussard et al. | 340/573.1 |
| 6,867,688 | B2 * | 3/2005 | Lamb | 340/286.02 |
| 7,227,463 | B2 * | 6/2007 | Merrell | 340/539.1 |
| 7,289,036 | B2 * | 10/2007 | Salzhauer et al. | 340/692 |

* cited by examiner

*Primary Examiner*—George A Bugg
*Assistant Examiner*—Son M Tang
(74) *Attorney, Agent, or Firm*—John D. Gugliotta

(57) ABSTRACT

A blanket with integral vibrating mechanisms for awakening a sleeper during an emergency. A control box receives information and based on an array of user settings, the control box will either actuate the vibrating mechanisms or produce a sound capable of being heard with the human ear. The control box receives information through its antenna from various authority agencies. The control box may be limited in who it may communicate with, what language it may produce sounds in, or at what distance it is allowed to communicate.

3 Claims, 3 Drawing Sheets

SLEEP SAFETY ALARM

RELATED APPLICATIONS

The present invention is a Continuation in Part of U.S. Ser. No. 10/783,302, filed on Feb. 23, 2004 now abandoned and incorporated by reference fully as if rewritten herein. There are no previously filed, nor currently any co-pending applications, anywhere in the world.

BACKGROUND OF THE INVENTION

1. Field of the Invention

The present invention relates generally to alerting devices, and, more particularly, to a system for providing notice to sleeping individuals 2. Description of the Related Art As any home owner will attest, security is an area of primary concern. Due to the fact that people tend to place a high value on their property and personal safety, the marketplace has responded with a variety of products that are intended to protect one's life and property. Perhaps the most common of these products is the smoke alarm. Such alarms have undoubtedly saved countless lives since their use began. However, even if these smoke alarms are provided with flashing strobe lights, those who are deaf or hard of hearing are left completely unprotected while sleeping.

A search of the prior art did not disclose any patents that read directly on the claims of the instant invention; however, the following references were considered related:

U.S. Pat. No. 6,377,177 discloses a baby blanket with baby monitoring system.

U.S. Pat. No. 4,614,939 discloses a method and device for detection of a blanket or the like being kicked off the body of a sleeping person.

U.S. Pat. No. 4,411,034 discloses a blanket device with alarm.

U.S. Pat. No. 5,867,105 discloses a wireless alarm system.

U.S. Pat. No. 5,912,624 discloses an infant's sleep time monitor.

U.S. Pat. No. 6,285,289 discloses a smoke detector wrist kidnapper alarm.

And, U.S. Pat. No. 4,195,287 discloses a fire and absence detection and alarm system for bed occupants Consequently, there is a need for a means by which those who are deaf or hard of hearing can be protected from the threat of fire while sleeping thus ensuring their safety.

SUMMARY OF THE INVENTION

It is therefore an object of the present invention to provide an improved sleep safety alarm.

It is a feature of the present invention to provide a sound activated alarm blanket.

Briefly described according to one embodiment of the present invention, a control box is capable of receiving information from the local authorities. Based on that information and based on the settings of the user, a control box and blanket will notify a sleeping individual of the current situation. The control box has the capability of vibrating a blanket and sending messages through a speaker to allow an individual to assess the current situation.

The use of the present invention provides a means of safely awakening even the soundest sleeper in the event of an emergency, allowing them adequate time to safely evacuate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Figure 1:
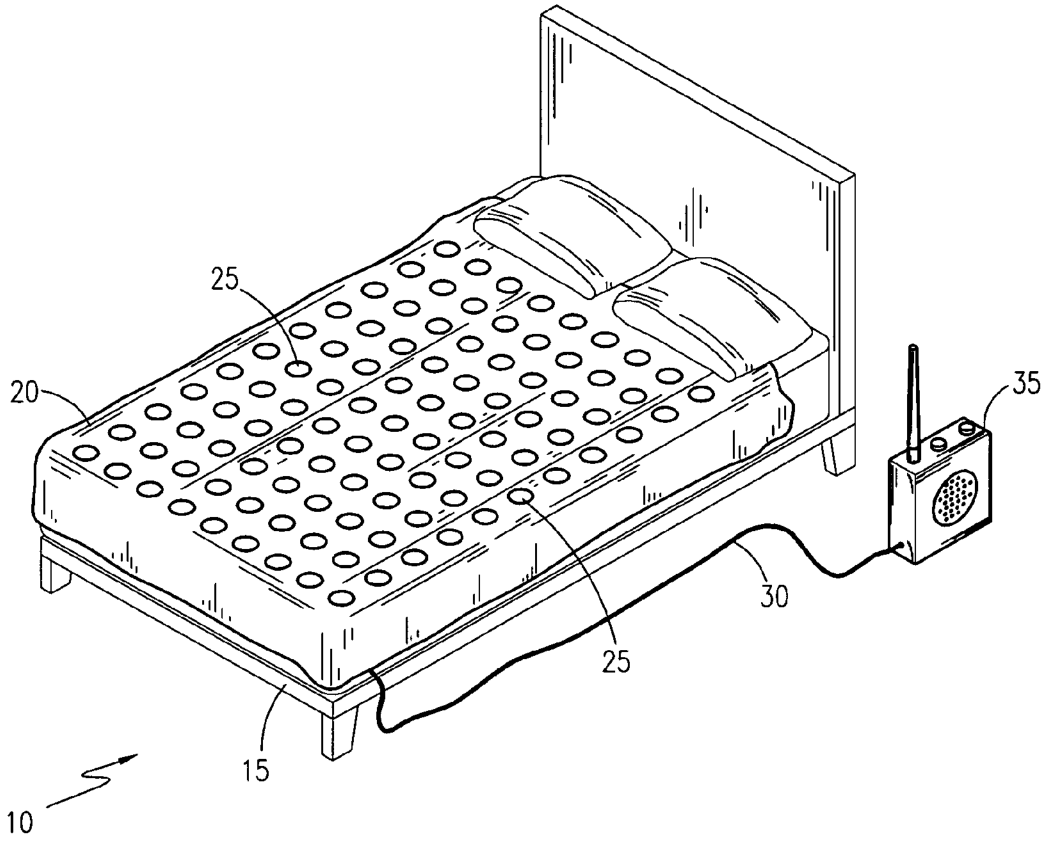
FIG. 1 is an overall pictorial representation of the sound activated alarm blanket 10, according to a preferred embodiment of the present invention.

Referring now to FIG. 1, a pictorial representation of the sound activated alarm blanket 10 is depicted, according the preferred embodiment of the present invention. A conventional bed 15 (or other suitable sleeping surface, such as a floor, inflatable mattress or couch, for example), is provided with a vibrating blanket 20, which covers the sleeping occupant of the conventional bed 15 during use, as would be conventionally expected. While the conventional bed 15 is shown as a double bed and appropriately sized blanket, it should be noted that the size of the conventional bed 15 and vibrating blanket 20 is not limited to any particular size, and as such, should not be a limiting factor of the present invention. A plurality of vibrating modules 25, are imbedded in the layers of the vibrating blanket 20. Said vibrating modules 25 are arranged in a grid pattern such that a quantity of twenty-four (24) vibrating modules 25 provide coverage for the individual sleeper. This quantity will provide a grid pattern with dimensions of approximately ten (10) to twelve (12) inches on center. This pattern will ensure that even though not all of the vibrating modules 25 will be in contact with the sleeping occupant of the conventional bed 15, multiple contacts about the torso and leg area will be made, no matter what position the occupant may be lying in. A total quantity of forty-eight (48) are shown in FIG. 1, due to the fact that a double bed is depicted, and as such, two people may be sleeping. The vibrating modules 25 are interconnected by imbedded cabling similar to that used in an electric heating blanket. Preferably, an interconnecting cable 30 carries low voltage electrical power from a control box 35 to the vibrating blanket 20. The control box 35 receives input signals from external audible and/or electrical stimuli, and generates a voltage that activates the vibrating feature of all vibrating modules 25. However, it is possible for the control box 35 to control the blanket 10 wirelessly, preferably up to 100 feet. Such vibration is intended to awaken the sleeping occupant of the conventional bed 15 and to provide alerting functions to possible danger. Further definition of the vibrating modules 25 and the control box 35 will be provided herein below.

Figure 2:
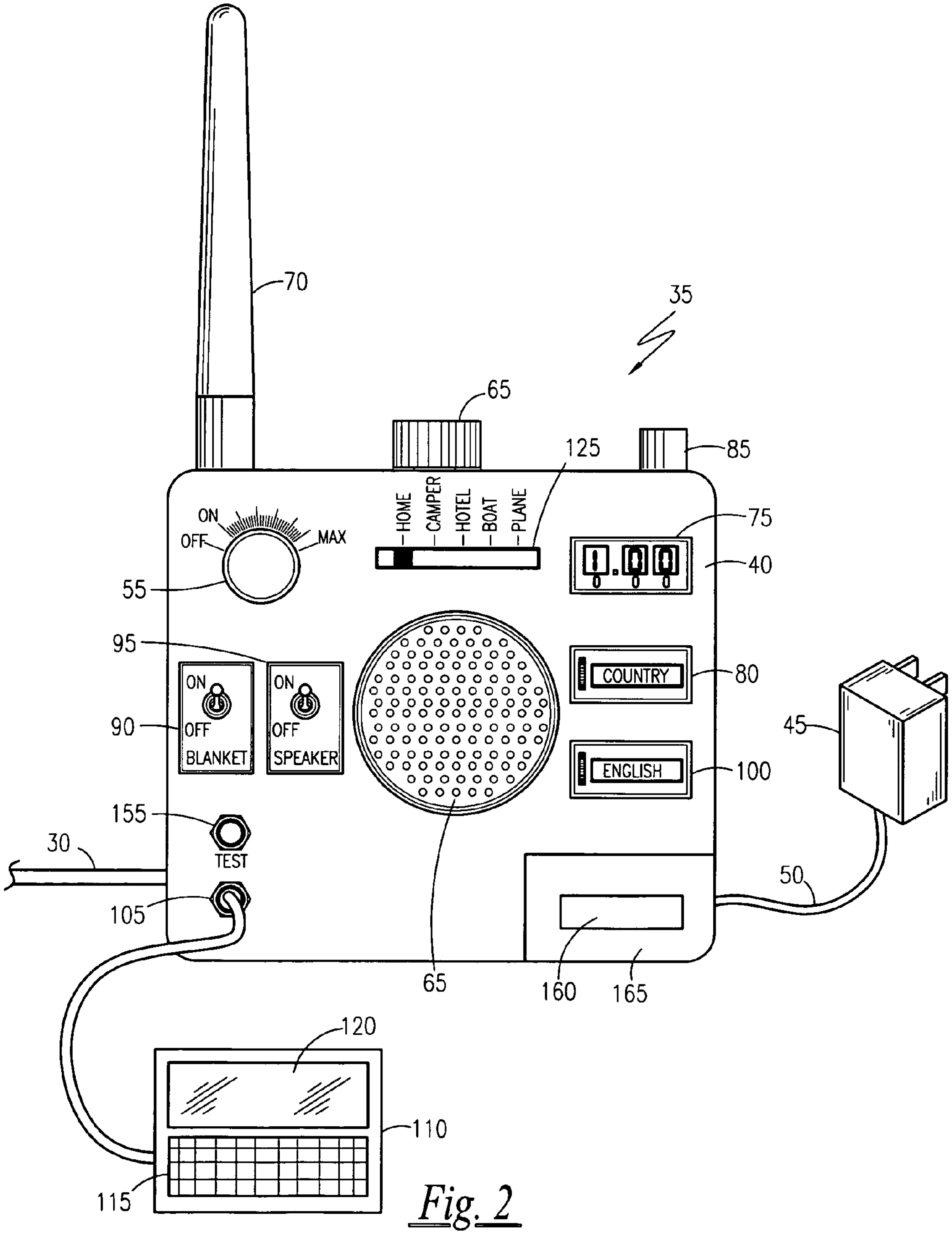
FIG. 2 is an isometric view of the control box 35, as used with the sound activated alarm blanket 10.

Referring next to FIG. 2, a detailed isometric view of the control box 35 is disclosed. The control box 35 provides an enclosure 40, envisioned to be made of plastic, and the approximate size of a common bed-side clock radio unit. As such, the control box 35 can sit on the floor near the conventional bed 15 (as shown in FIG. 1) or on a nearby bed-side table or night stand. The control box 35 preferably receives its power from a wall mounted power supply 45 and a power cord 50, as is well-known in the art. However, it is possible to power the control box from any type of powering system, such as through battery power or solar power. Preferably, this battery power can be a battery pack 160 that operates in case of a power outage and is inserted into the battery receiving means 165. The interconnecting cable 30, which carries low-voltage power to the vibrating blanket 20 (as shown in FIG. 1) exits the opposite side of the enclosure 40 as shown.

A power dial 55 removes power supplied to the control box 35 during periods of non-use when placed in an off position. A power on indicator light 60 indicates the presence or absence of electrical power by illumination or non-illumination respectively. A speaker 65 functions to communicate audible information. The control box 35 receives information though its antenna 70. A distance dial 75 allows the user to select the distance the control box can transmit. For instance, if the user only wanted to transmit with fire stations within one mile, then the user could select that from the distance dial 75. An authorities selection switch 80 enables the user to select which authorities the control box 35 will communicate with. For instance, the user can select to correspond with neighborhood, local, city, county, state, regional, and national authorities. The authorities selection switch 80 could also be configured to select authority type, such a police, fire, and hospital. A emergency button 85 is available and when pressed, the control box 35 sends global position data to the selected authorities or sends the information automatically to '911'.

Blanket switch 90 and speaker switch 95 operate to regulate the control box 35 output. Toggling the blanket switch 90 on and off changes if the blanket will vibrate when appropriate information is received. Toggling the speaker switch 95 on and off changes if the speaker will output audible information. Additionally, a language dial 100 is capable of changing the language of the audible messages based on languages stored on a microchip inside the control box 35. For example, a language chip could be configured to give messages in English, Russian, German, French, and Polish. However, any languages could be used. The control box 35 may also have at least one remote input terminal 105. Shown connected to this remote input terminal 105 is a regulator box 110. Though shown as a separate attachment, this regulator box 110 can have all of its features incorporated into the control box 35 itself. The regulator box 110 can override some or all of the other settings, and can select certain functions. For instance, the user could input into the keypad 115 on the regulator box 110 to have the blanket 10 vibrate when a signal is sent from a local authority, while the speaker 65 gives audio information from any other authority. The selection can be displayed on the computer screen 120. Additionally, the control box 35 can be configured with a location dial 125. A number of different locations can be selected, such as home, apartment, hotel, boat, or plane. Different settings can be preprogrammed based on the location. For example, the boat setting may have the control box send out location information to selected authorities at a specific time interval while the home setting will not since typically, homes do not move while boats do move. A test button 155 may be used to make sure the control box 35 is working.

All items referred to as dials, switches, buttons, keypads, and the like are all interchangeable and can be configured in the appropriate manner.

Figure 3:
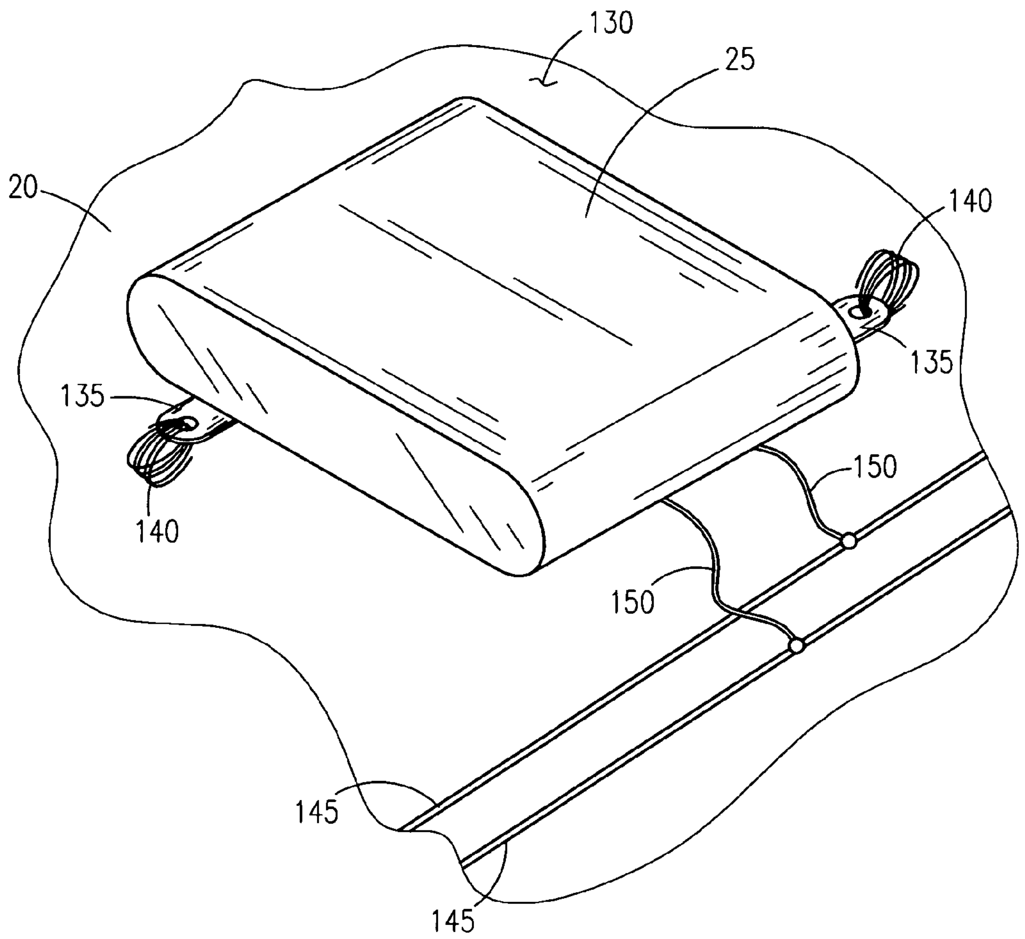
FIG. 3 is a cutaway view of the vibrating blanket 20, depicting vibrating modules 25.

Referring now to FIG. 3, a cutaway view of the vibrating blanket 20, depicting a vibrating module 25 is shown. The vibrating module 25 is held captive between two layers of fabric of which a lower fabric layer 130 is shown for purposes of clarity. The vibrating module 25 is held in place by two or more mounting flanges 135 which are sewn to the lower fabric layer 130 by use of thread 140. The interior of the vibrating module 25 houses a simple direct current motor with an offset weight, which when activated, produces the vibrating effect. This procedure is well known in the art, and is used for vibrating mechanisms on wireless phones, pagers and the like. A set of bus wires 145 which carry the low-voltage direct current to all of the vibrating modules 25 in the vibrating blanket 20 (as shown in FIG. 1) are provided in a parallel arrangement as shown. A set of drop wires 150 in electrical contact with the bus wires 145 then carry the direct current to the vibrating module 25. The parallel connection as shown allows the remaining vibrating module 25 to remain operational should one or more of the vibrating module 25 become non-functional.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. After purchase or procurement of the sound activated alarm blanket 10, the vibrating blanket 20 is laid out upon the conventional bed 15 in a conventional manner. It should be used right above the top sheet on the conventional bed 15, such that additional blankets, comforters, quilts, bed spreads, and the like will not reduce the vibrating effect from the vibrating modules 25 upon the user's torso or leg area. Next. the user would plug the wall mounted power supply 45 into a suitable source of electrical power. Then the power dial 55 would be engaged and verified by illumination of the power on indicator light 60. Finally, the user would test the operation of the sound activated alarm blanket 10 by pressing the test pushbufton 155 and verifying the vibration of the vibrating modules 25 on the vibrating blanket 20. Should any external wiring such as from a weather alert radios, security alarm systems, fire alarm systems, and the like be required, it would be connected to the remote input terminals 105. At this point the sound activated alarm blanket 10 is ready for use.

During the actual use of the sound activated alarm blanket 10 the user or sleeper would sleep in the conventional bed 15 and cover themselves with the vibrating blanket 20 in a normal and expected manner. During the night or while sleeping, should a smoke alarm, a carbon monoxide (CO) alarm, a telephone, an alarm clock, activate, or the sound of a barking dog or breaking glass occur, the control box 35 will send an electrical signal along the interconnecting cable 30 to the vibrating blanket 20 causing all vibrating modules 25 to vibrate and awaken the user, who can then take appropriate action.

Also, local, state, and Federal authorities will govern the data that is sent to the control box 35 through the antenna 70. The Federal authorities (national government) may have the power to override the system and be the only authorities able to send information to the control box 35. If the authorities wanted to send information, they would send it to the control box 35. The control box 35 would then send the message to the blanket 10 three times unless it is silenced by the user with switch 90. Also, the audio message would be played.

For example, in a fire is detected in your home, the local authorities can send a message to the control box 35. Additionally, the control box 35 can receive global positioning system data through the antenna 70 as to the distance of a dispatched fire truck. When this information is received, the blanket 10 will vibrate a specific pattern based on a fire and the speaker 65 will announce instructions based on the data in the language selected, such as "There is a fire, please exit the building along the north stairwell."

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

I claim:

1. An alarm system comprising:

a vibrating blanket;

a plurality of vibrating modules embedded in said vibrating blanket;

a control box attached to said blanket and operatively connected to said vibrating modules to actuate upon receiving external stimuli;

wherein said control box contains a means for disabling the ability to actuate vibration of said plurality of vibrating modules, said control box further comprising a means for language selection that produces said sound wave in at least one spoken language; and said alarm system capable of being interchanged between a plurality of sleeping surfaces.

2. The alarm system of claim 1, said control box further comprising a battery pack operative during electricity outages.

3. The alarm system of claim 1, said control box further comprising an emergency button that sends out an electronic signal to a specific location when actuated.

* * * * *